United States Patent [19]
Van Cleave

[11] 3,746,970

[45] July 17, 1973

[54] ROOT MEAN SQUARE VOLTAGE REGULATOR

[75] Inventor: George William Van Cleave, Lexington, Ky.

[73] Assignee: International Business Machines Corporation, Armonk, N.Y.

[22] Filed: Apr. 13, 1972

[21] Appl. No.: 243,724

[52] U.S. Cl. ................. 323/22 SC, 315/307, 323/24
[51] Int. Cl. ............................................... G05f 1/44
[58] Field of Search .................... 307/252 B, 252 N, 307/252 UA; 315/196, 209, 307; 323/22 SC, 24, 34

[56] References Cited
UNITED STATES PATENTS
| | | | |
|---|---|---|---|
| 3,183,372 | 5/1965 | Chin | 323/24 UX |
| 3,375,403 | 3/1968 | Flieder | 323/24 UX |
| 3,456,133 | 7/1969 | Warren | 323/24 X |
| 3,501,771 | 3/1970 | Miller et al. | 323/22 SC |
| 3,593,112 | 7/1971 | Coats et al. | 323/24 |

*Primary Examiner*—A. D. Pellinen
*Attorney*—John W. Girvin, Jr. et al.

[57] ABSTRACT

A regulating power supply circuit in which the power supplied at the output is controlled by controlling the firing angle of a thyrister switching device in response to changes in a hybrid signal which is indicative of the difference between the RMS value of the output voltage and a desired RMS value. The hybrid signal is formed by summing a feedback current proportional to the absolute load voltage with a reference current proportional to the firing angle of the thyrister on a summing capacitor. Since for any given RMS voltage, the value of the average load voltage varies linearly with the conduction angle over a large range of conduction angles, the phase angle proportional reference current source is utilized to relate the absolute output voltage with the RMS voltage linearly over a wide range of input voltages.

3 Claims, 3 Drawing Figures

PATENTED JUL 17 1973 3,746,970

ROOT MEAN SQUARE VOLTAGE REGULATOR

BRIEF BACKGROUND OF THE INVENTION

1. Field

This invention relates to a power regulating device and more particularly to a circuit for precisely controlling at a constant level the amplitude of the root mean square voltage supplied to a load from an A.C. power source.

2. Description of the Prior Art

Various voltage regulator devices have been constructed to control the power output supplied to a load. These devices include power invertor supplies, ferro resonant supplies, and control circuits adapted to co-act with bi-directional current conducting semi-conductor devices. The former devices exhibit large physical size characteristics and furthermore are dependent upon a high degree of regulation of the input voltage source in order to provide a relatively constant RMS voltage output. Further, when the amplitude of the commercial A.C. voltage supply is changed (as, for example, from country to country), it is necessary to employ different transformers and/or impedance networks to provide the desired output RMS voltage.

Various control circuits adapted to co-act with bi-directional current conducting semi-conductor devices such as thyristers have been proposed which will effect a high degree of root mean square voltage regulation. The control circuits generally utilize a feedback signal which is proportional to the average load voltage and weight that signal in a manner to obtain an approximation of the RMS output voltage. This feedback signal then controls the degree of conduction of the bi-directional current conducting device thereby causing the device to maintain a relatively constant RMS voltage output. An example of such a voltage regulator is described in U.S. Pat. No. 3,532,855 assigned to the assignee of the present invention. In the patented device, the average voltage proportional signal is related to the RMS voltage by a compensating resistor having a current therein proportional to the peak value of the input voltage. Various other circuits have also utilized the peak value of the input voltage to compensate the output absolute voltage signal to obtain an approximation of the RMS voltage. In each of these prior devices, the approximation between the output absolute voltage and the RMS voltage is maintained only over a limited input voltage range. That is, large variations in input voltage effect variations in the output RMS voltage. Such variations are highly significant when the output RMS voltage is converted into light energy to be utilized in an environment, such as a copying machine, wherein slight variations in light levels effect large variations in output copy quality.

SUMMARY

In order to overcome the above noted shortcomings of the prior art and to provide an RMS voltage regulator which is physically small and which provides a highly regulated output RMS voltage regardless of input voltage variations over a wide range of input voltage variations, the present invention employs a linear method of compensating the absolute output voltage as supplied by a bi-directional current conducting device over a wide range of input voltages. Thus, for a given desired RMS output voltage, a signal representative of the absolute output voltage is fed back to a control circuit and summed with a signal proportional to the conduction angle of the bi-directional current conducting device. The output signal of the summing device is directly proportional to the difference between the output RMS voltage of the regulator and a desired RMS voltage over a wide range of input voltage variations and is utilized to maintain the regulator's output at the desired RMS voltage.

Accordingly, it is the principle object of the invention to automatically and precisely control the RMS voltage output of a voltage regulator.

It is a further object of the invention to directly sense a signal proportional to the absolute voltage output of the regulator and to compensate that signal with a second signal proportional to the firing angle of a bi-directional current conducting semi-conductive device connected between the A.C. supply source and the load to control the RMS voltage output of the regulator.

The foregoing and other objects and advantages of the invention will be apparent from the following more particular description of a preferred embodiment of the invention as illustrated in the accompanying drawings.

DESCRIPTION

Figure 1:
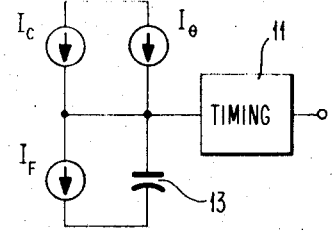
FIG. 1 is a schematic equivalent circuit diagram depicting the principles employed in the control circuit of the present invention.

Referring now to the drawings and more particularly to FIG. 1 thereof, a schematic equivalent circuit diagram depicting the principles employed in the control circuit of the present invention is shown. The control circuit of the present invention controls a timing circuit 11 which in turn determines the time from the zero crossing of the A.C. line voltage until a thyristor is fired. Firing of the thyristor enables that device to conduct current from a supply to a load. The control circuit is thus utilized to control the firing angle of the thyrister and to thereby maintain the RMS voltage across the load at a constant. This is achieved by constructing a current balance between a current proportional to the average load voltage and a standard current such that an imbalance in current results in the charging or discharging of capacitor 13. The voltage on capacitor 13 is the controlling parameter of the variable timing circuit 11.

The implementation of the current balance is achieved by summing three current sources which can further be simplied to two current sources. Initially, a feedback current $I_F$ proportional to the rectified output load voltage is combined with a current $I_\theta$ 24 proportional to the conduction angle of the thyrister. The combined difference current $(I_f - I_\theta)$ is compared with a constant current $I_C$ to consequently cause the charging or discharging of the capacitor 13. Providing that the desired RMS voltage does not require a low or high conduction angle from the thyristor device, a linear relationship exists between the average of the feedback current $I_F$ and the current $I_\theta$. That is for any given RMS voltage, it can be shown that the value of the absolute voltage corresponding to the phase controlled sine wave follows the relation: $V=AX+B$ where X is the conduction angle: V and B are values of absolute voltage; and A is a constant relating X to B. This linear relationship between $I_F$ and $I_\theta$ is thus utilized to provide an excellent degree of RMS voltage regulation which is independent of wide line voltage variations.

Thus, if the feedback current $I_F$ exceeds the standard current derived from the currents $I_C$ and $I_\theta$, the capacitor 13 is discharged. This decrease in capacitor voltage results in a longer timing period of the timing circuit 11 and thus a later firing angle for the thyristor. As the conduction angle is thereby shortened, the rectified absolute voltage across the load is reduced until the load voltage proportional current $I_F$ is brought into balance with the standard current. If the load voltage proportional current $I_F$ becomes smaller than the standard current, then the capacitor 13 is charged. As the capacitor voltage increases, the timing period of a timing circuit 11 decreases and the thyristor firing is initiated earlier. As the conduction angle is lengthened, the load voltage increases until the current balance is restored. In this manner, the control circuit maintains a constant RMS voltage across the load. If the load is resistive, the power in the load will be held constant. The RMS voltage regulator thus controls the RMS value by utilizing the linear relationship between the average voltage and the conduction angle. Previous circuits have utilized the peak input voltage to relate the RMS and average voltage and provide accurate regulation only over a small input voltage variation range.

Figure 2:
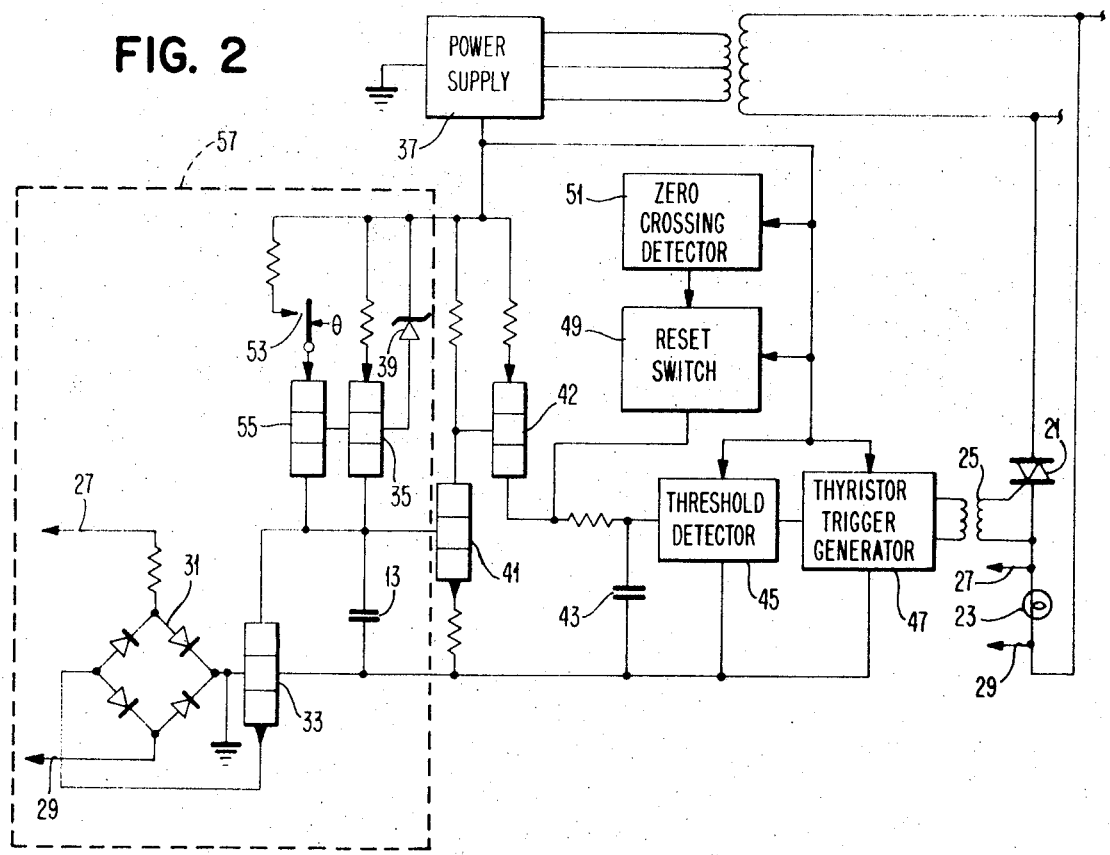
FIG. 2 is a schematic circuit and block diagram of the RMS voltage regulator of the present invention.

The current sources can be constructed in various configurations, the best regulation being achieved when the phase angle proportional current and the load voltage proportional current are combined before the current balance is constructed. Thus the current balance is the summation of a current ($I_F-I_\theta$) and a constant current ($I_C$) which yields a virtually constant RMS voltage over a very wide range of input voltage variations. In an actual circuit design, the current balance is developed by use of transistors, resistors, diodes, and a voltage source. FIG. 2 is a schematic circuit and block diagram of the RMS voltage regulator of the present invention utilizing a simplified control circuit.

Referring now to FIG. 2 of the drawings, a thyristor 21 is connected between a 115 volt A.C. supply in series with a load such as an illumination lamp 23. The thyristor 21 is a silicon bi-directional triode device or switch capable of conducting relatively high current in both directions and whose time of initial conduction during a half cycle is dependent on when a control voltage is impressed across transformer 25. Once the thyristor 21 is rendered conductive during a half cycle of the supply voltage, it will remain conductive until the supply voltage is reversed at the beginning of the next half cycle of the supply voltage. The overall arrangement is that by controlling the firing angle of the thyristor 21, the root mean square voltage across the illumination lamp 23 is acurately regulated.

The firing angle of the thyristor 21 is controlled by feeding back the instantaneous value of the voltage across the lamp over feedback leads 27, 29 to the bridge rectifier 31. The output signal of the bridge rectifier 31 thus represents the rectified value of the instantaneous load voltage and is applied to transistor 33.

Transistor 35 has its base electrode clamped to the supply voltage 37 by Zener diode 39. Transistor 35 thus supplies a constant current to the summing capacitor 13 tending to charge the capacitor 13. The current supplied by transistor 35 causes the charge on capacitor 13 to gradually build-up thereby creating a "soft-start" of the voltage regulator. Once the charge level on capacitor 13 biases transistors 41 and 42 into conduction, a current proportional to the voltage on capacitor 13 is supplied to sawtooth capacitor 43. When the charge on this capacitor reaches a pre-determined level, the threshold detector circuit 45 provides a signal to the thyristor trigger generator 47 which in turn causes the thyristor 21 to conduct. The charge on the sawtooth capacitor 43 is reset each half cycle by the reset switch 49 which is in turn responsive to the zero crossing detector 51. That is, when the A.C. signal from the 115 volt supply reverses polarity, the zero crossing detector 51 effects the temporary closure of the reset switch 49 providing a discharge path for the capacitor 43. Thus a voltage ramp, having a slope proportional to the voltage on capacitor 13, is produced on capacitor 43 which determines the firing angle of the thyristor.

When the thyristor 21 fires, the switch 53 is closed providing a current through transistor 55 which is subtracted from the feedback current supplied by transistor 33. The resultant current is in turn combined with the constant current supplied by the transistor 35. Initially, the voltage at the base electrode of transistor 41 slowly rises due to the charge across the capacitor 13 provided by the current from transistor 35. This slowly rising voltage causes the sawtooth wave form generated by capacitor 43 to have a gradually increasing slope and hence greater amplitude at the completion of each successive half cycle. Eventually, the level of the sawtooth is sufficient to trigger the threshold detector 45 which in turn causes the thyristor trigger generator to provide a pulse to the thyristor 21. The thyristor at this time conducts only during a short final portion of the A.C. half cycle thereby providing a small amount of feedback current through the leads 27, 29. Additionally, switch 53 is closed during the conduction of the thyristor 21 thereby providing a current which is subtracted from the feedback current. This combined current is subtracted from the constant current supplied by the transistor 35 causing the rate of charge of capacitor 13 to decrease slightly. However, the voltage on the capacitor 13 continues to increase until the compensated feedback current is equal to the constant reference current supplied by transistor 35 at which time the charge level remains constant. At this point, an equilibrium condition is maintained since the charging current to the sawtooth capacitor 43 is proportional to the voltage on the capacitor 13.

Figure 3:
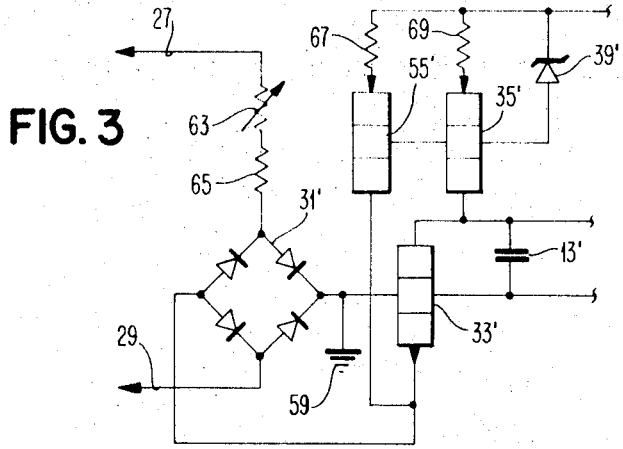
FIG. 3 is a circuit diagram of an alternate control circuit which may be utilized with the RMS voltage regulator of the present invention.

Referring now to FIG. 3, a circuit diagram of an alternate control circuit which may be utilized with the RMS voltage regulator of the present invention is depicted. This control circuit may be used in lieu of the control circuit 57 depicted in FIG. 2 of the drawings. In operation, transistor 35' supplies a constant charging current to the capacitor 13' in a manner analogous to that heretofore described with respect to the control circuit 57. The current supplied by the transistor 55' when there is no feedback signal on leads 27, 29 flows through the bottom portion of the bridge rectifier 31 to A.C. ground 59. This current thus has no effect on the charge level of capacitor 13'. When a feedback signal is supplied over feedback leads 27–29, the feedback current supplied at the base electrode of transistor 33' tends to discharge the charge on capacitor 13' when the feedback current exceeds the current supplied by transistor 55'. That is, the current supplied by transistor 55' subtracts from the feedback current whenever feedback current is present. When the feedback current exceeds that supplied by transistor 55', it subtracts from the current supplied by transistor 35'. An equilibrium condition then results as described with respect to FIG. 2 wherein the charge on capacitor 13' achieves a constant level.

The bridge rectifier 31' acts in an analogous manner to the switch 53 of FIG. 2 causing a phase angle proportional current as supplied by transistor 55' to be subtracted from the feedback current. It is to be noted that the circuit of FIG. 3 differs from that of FIG. 2 in that it prevents the current flowing from transistor 55' from affecting the charge on the capacitor 13' when that current exceeds the feedback current. It has been found that the linear relationship between the feedback current, the phase angle proportional current, and the RMS voltage is improved by the action of the circuit of FIG. 3.

Variable resistor 63 controls the setting of a desired RMS voltage output. Once the desired RMS output voltage is thus set, the circuit is virtually insensitive to input voltage variations and supplies the desired RMS voltage after an initial "soft start" delay occasioned by the build up of charge on capacitor 13. The "soft start" protects lamp filaments from excessive cold start currents.

A circuit was constructed with the following component values to provide an RMS voltage of 85 volts regulated ±1 percent from a 115 volt source which varies ±15 percent:

R63–20K
R65–15.8K
R67–1.18K
R69–3K
C13'–330 uf
Z39'–3.6 V nominal
T55', T35', T33'–IBM 136, 136, IBM 194

From the foregoing description of the root mean square voltage regulator, it will be apparent that an improved economical arrangement has been provided for controlling the root mean square magnitude of the load voltage which is virtually insensitive to changes in the supply voltage. As is appreciated by those skilled in the art, various circuit arrangements can be utilized to achieve the invention. For example, a single current source could be utilized to supply both the phase angle dependent current (I   ) as well as the constant current ($I_c$), it being only necessary to supply both currents to the summing device.

While the invention has been particularly shown and described with reference to preferred embodiments thereof, it should be understood by those skilled in the art that the foregoing and other changes in form and detail may be made therein without departing from the spirit and scope of the invention.

What is claimed is:

1. A root mean square voltage regulator for controlling in each half cycle the output voltage supplied to a load from an alternating current supply, said regulator comprising:

switching means switchable from a high impedance condition to a low impedance condition in each half cycle connected between said load and said alternating current supply;

said switching means having at least one control element for switching said switching means to said low impedance condition when a control signal supplied to the control element exceeds a predetermined threshold level;

a feedback circuit connected in circuit with said switching means and said load for supplying a first signal indicative of the absolute value of the output voltage;

circuit means coupled with said switching means for supplying a second signal indicative of the duration within each half cycle of the low impedance condition of said switching means;

a constant signal source for supplying a constant signal;

summing means for combining at least portions of said first signal, said second signal, and said constant signal for synthesizing a hybrid signal indicative of the difference between the root mean square value of the output voltage signal and a desired root mean square value;

and means coupled with said summing means and said control element for supplying said control signal as a function of said hybrid signal thereby to maintain the root mean square magnitude of the output voltage substantially at a preselected level.

2. The root mean square voltage regulator set forth in claim 1 wherein said feedback circuit includes rectifying means connected in circuit with said switching means and said load for supplying said first signal.

3. The root mean square voltage regulator set forth in claim 1 wherein said first signal, said second signal, and said constant signal being current signals and wherein said summing means comprises a capacitor.

* * * * *